United States Patent
Di Liddo

(10) Patent No.: US 10,167,217 B2
(45) Date of Patent: Jan. 1, 2019

(54) PROCESS FOR INDUSTRIAL PRODUCTION OF SEA WATER BASICALLY SUITABLE FOR FOOD USE

(71) Applicant: STERALMAR SRL, Bisceglie (BT) (IT)

(72) Inventor: Pietro Di Liddo, Bisceglie (IT)

(73) Assignee: STERALMAR SRL, Bisceglie (BT) (IT)

( * ) Notice: Subject to any disclaimer, the term of this patent is extended or adjusted under 35 U.S.C. 154(b) by 227 days.

(21) Appl. No.: 14/902,932

(22) PCT Filed: Jul. 4, 2014

(86) PCT No.: PCT/IT2014/000176
§ 371 (c)(1),
(2) Date: Jan. 5, 2016

(87) PCT Pub. No.: WO2015/001581
PCT Pub. Date: Jan. 8, 2015

(65) Prior Publication Data
US 2016/0185637 A1    Jun. 30, 2016

(30) Foreign Application Priority Data
Jul. 5, 2013  (IT) .............. BA2013A0056

(51) Int. Cl.
*C02F 1/32* (2006.01)
*C02F 1/42* (2006.01)
(Continued)

(52) U.S. Cl.
CPC .............. *C02F 9/00* (2013.01); *C02F 1/42* (2013.01); *C02F 1/444* (2013.01); *C02F 1/004* (2013.01);
(Continued)

(58) Field of Classification Search
CPC .... C02F 1/444; C02F 9/00; C02F 1/42; C02F 1/004; C02F 1/32; C02F 2001/007;
(Continued)

(56) References Cited

U.S. PATENT DOCUMENTS

| 7,097,852 B1* | 8/2006 | Soto ............. A61K 9/0043 210/652 |
| 2011/0108488 A1* | 5/2011 | Vanhoorne ........... C02F 1/42 210/683 |
| 2014/0199247 A1* | 7/2014 | D Az-Crespo Cardona ........ A23L 2/52 424/49 |

FOREIGN PATENT DOCUMENTS

| CN | 202 201 774 U | 4/2012 |
| DE | 10 2007 040763 A1 | 3/2009 |
| JP | H09-220564 | 8/1997 |
| JP | 2010 058080 A | 3/2010 |
| RU | 54587 | 7/2006 |
| RU | 89067 | 11/2009 |
| RU | 2389693 | 5/2010 |
| RU | 114951 | 4/2012 |

OTHER PUBLICATIONS

Diaz Crespo Cardona, Spanish Patent Application ES201330047 filed on Jan. 17, 2013, 29 pages.*

(Continued)

*Primary Examiner* — Matthew O Savage
(74) *Attorney, Agent, or Firm* — Young & Thompson

(57) ABSTRACT

A process for the industrial production of sea water (M3) that is basically suitable for alimentary use, includes the following steps: drawing sea water with corresponding decantation (3); filtration (4); and sterilization (5), until a purified sea water (M1) is obtained; the process being characterized in that it envisages the further steps of: boron abatement (6) until a sea water is obtained with a boron content of less than one milligram per liter (M2); further filtration (7); sterilization (8) of the possible residual microorganisms; continuous and strict analyses, examinations, and checks (9) of the sea water in the respective various steps of purification thereof, to guarantee that a sea water (M3) is obtained that is microbiologically pure, filtered, and hence free from any pathogenic agents; and storage in tanks or bottling (10) of the purified sea water ready for use in (Continued)

Figure 1:
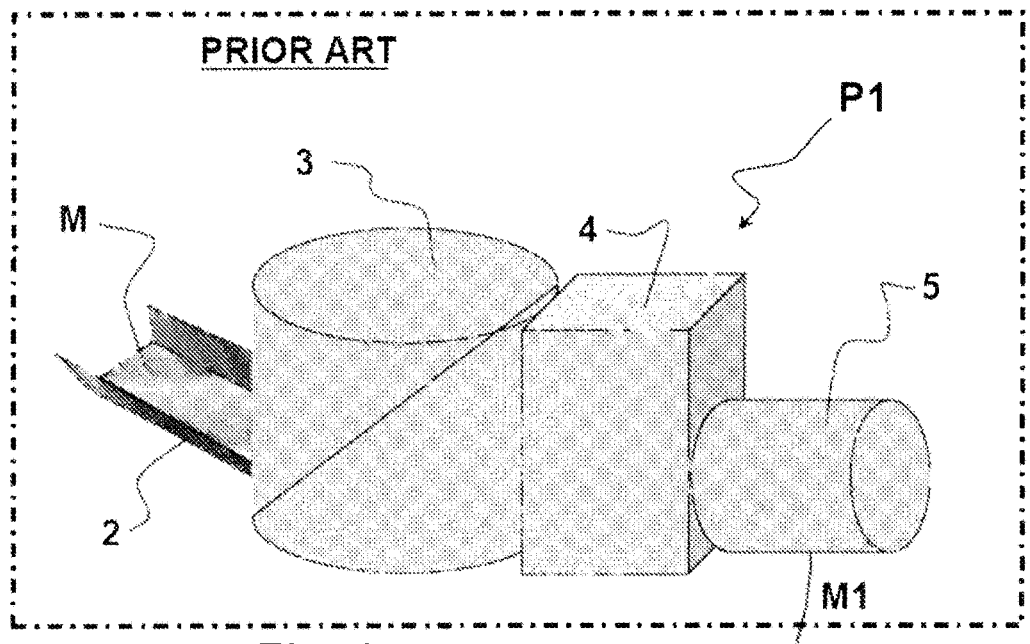

various applications, amongst which basically alimentary use.

13 Claims, 1 Drawing Sheet

(51) Int. Cl.
*C02F 9/02* (2006.01)
*C02F 9/00* (2006.01)
*C02F 1/44* (2006.01)
*C02F 1/00* (2006.01)
*C02F 101/10* (2006.01)
*C02F 103/08* (2006.01)

(52) U.S. Cl.
CPC .......... *C02F 1/32* (2013.01); *C02F 2001/007* (2013.01); *C02F 2001/422* (2013.01); *C02F 2101/108* (2013.01); *C02F 2103/08* (2013.01); *C02F 2201/006* (2013.01); *C02F 2303/04* (2013.01)

(58) Field of Classification Search
CPC .......... C02F 2001/422; C02F 2101/108; C02F 2103/08; C02F 2201/006; C02F 2303/04
See application file for complete search history.

(56) References Cited

OTHER PUBLICATIONS

Ronald Lee et al.: "Bivalve depuration: fundamental and practical aspects", Dec. 31, 2008 (Dec. 31, 2008), XP055109318, Rome, Italy ISBN: 978-9-25-106006-3 Retrieved from the Internet, p. 20, paragraph 4.2 p. 28, paragraph 5.4 p. 29; figure 5.8 Chapter 6; p. 33-p. 37.
International Search Report, dated Jan. 7, 2015, from corresponding PCT application.
RU Search Report for Application No. 2016103215, dated Apr. 20, 2018.

* cited by examiner

PROCESS FOR INDUSTRIAL PRODUCTION OF SEA WATER BASICALLY SUITABLE FOR FOOD USE

The present invention relates to an innovative and inventive process for the industrial production of sea water basically suitable for alimentary use.

The present process is totally new in so far as up to now there do not exist processes of this sort in the prior art that provide a water that is non-toxic and microbiologically pure, filtered and sterilized, suitable for being used as bulk sea water or as bottled sea water for a wide range of applications.

The present process is moreover inventive, in so far as it solves the problem of obtaining with minimized costs production at an industrial level of microbiologically purified sea water in such a way that it may be suitable basically for alimentary use, using as row material the sea water already treated by a technologically known purification plant, such as the plant of a mollusc-purification centre (MPC), subjecting it to a further purification treatment and to continuous periodic checks of the critical parameters, thus providing a new process designed for industrial production of sea water that is basically suitable for alimentary use and for being marketed both in large volumes (i.e., which can be sold even as bulk sea water by means of tankers or bowsers) and in small volumes (drums, bottles, dispensers) for an unlimited number and variety of applications, such as for example: sea water for alimentary use, as flavouring or ingredient or medium for cooking foodstuffs; sea water for therapeutic use; sea water for hobby use, such as water for marine aquaria; etc.

Sea water is the water that is usually found in seas and oceans and has an average concentration of dissolved salts of approximately 35 g/l (the Lower Adriatic has a slightly higher concentration). The concentration of the dissolved salts obviously varies according to the contribution of rivers, precipitations, and intensity of evaporation. The proportion of salts, instead, remains practically always the same, with a preponderant percentage of sodium chloride (NaCl), which is usually present in amounts of between 70% and 80% with respect to the total amount of dissolved salts. Other elements and compounds frequently present as dissolved salts in ionic form, are calcium (Ca), magnesium (Mg), and carbonates ($CO_3$), as likewise sulphur (S) and potassium (K). In sea water also nitrates and phosphates are found, which rise to the surface thanks to the currents and favour the development of autotrophic organisms (algae). Also present in sea water are two dissolved gases, oxygen ($O_2$) and carbon dioxide ($CO_2$), which guarantee life for living beings that populate the sea for respiration and chlorophyll photosynthesis, respectively. Dissolved in the sea in small percentages are many other elements called oligoelements, amongst which strontium (Sr), boron (B), silicon (Si), fluorine (F), and iodine (I), in addition to plankton and organic waste materials or organic materials in decomposition (DOM—dissolved organic material).

The treatment of sea water, according to the intended application thereof, hence entails technologically costly and complex processes that frequently envisage the use of very costly and large-sized plants.

So far there are known plants for treating sea water for purification of edible Bivalvia by means of a procedure that comprises, in succession, the steps of sedimentation, filtration, and disinfection.

Sedimentation is the method most suited to systems with recirculation of water since non-recirculation systems would need large basins. The process is carried out in large tanks where the debris are left to settle usually even for a day (normally the cycle lasts twelve hours or more) so that the particles of large and medium dimensions will precipitate on the bottom of the tank. It is important for the sea water not to be moved during this period of decantation in order to prevent phenomena that might set the flocculating material once again in suspension during sedimentation. A disadvantage represented by this step is the fact that very fine particles do not settle and hence, in any case, the sedimentation process alone is not sufficient.

The next step of filtration aims at removing turbidity from the water, starting from the turbidity that is due to the suspension of particles from the coarsest up to the colloidal particles, adsorbing unpleasant odours, tastes, and colours, as well as organic micropollutants and heavy metals. In the majority of cases, industrial filters are made of steel and are coated with an anticorrosion protection constituted on the inside by a thick layer of epoxy resins, suitable for alimentary use and on the outside by a synthetic enamel. The filtering material proper is represented by various stratified minerals, such as anthracite and silica sands of variable grain size. At times it is necessary to provide two filtering systems in series that enable elimination of any type of turbidity, thus guaranteeing the quality of the effluent. This filtration step in the treatment of sea water to be used for purification of molluscs is inherent in the fact that the water thus treated can subsequently undergo a process of disinfection.

Disinfection of the water is in any case necessary for preventing the disadvantage of a likely contamination and guaranteeing a protection also from pathogens naturally present in sea water, such as vibrios. The most common systems for disinfection of sea water envisage the use of ultraviolet radiation or compounds of chlorine or ozone.

The UV disinfection system for the treatment of sea water may be either of the continuous-flow type or of the recirculation type. Very frequently used in purification plants are UV lamps for disinfection, which emit in the ultraviolet (wavelengths from 200 to 280 nm, with the microbicidal peak at 254 nm). Each unit is constituted by a single UV lamp covered by a quartz sleeve and contained within a tube in such a way that the sea water circulates in the space comprised between the tube and the sleeve and will be optimally irradiated by UV light.

The usual disadvantages of these disinfection processes are almost absent with the use of ultraviolet radiation, but are present with the use of chlorine and ozone, in so far as:
  chlorine requires a complex installation with a low power of elimination of viruses, high toxicity for human beings, production of trihalo-methanes, as well as having an irritating effect also on the molluscs themselves in the case where the water is used for the purification treatment;
  ozone, on the other hand, presents the disadvantage of being very costly both as disinfectant and in terms of expenditure for the corresponding plant, which moreover presents a high complexity both during installation of the plant and during the process of disinfection, with further costs for maintenance of the plant in steady running conditions, with further disadvantages linked to the possible ineffectiveness of the disinfectant action itself.

Sea water, usually treated with these processes has at times been used also for alimentary purposes, such as in cooking or for domestic cleaning and washing of fish products, but presents a further disadvantage in terms of enormously critical features due to the fact that it is not always possible to guarantee altogether perfect purification of the water thus treated.

The opinion of the European Food-Safety Authority (EFSA) of Mar. 20, 2012 has established that sea water, in order to be suitable for bottling, must present chemico-physical and microbiological parameters compliant with the requirements of the legislative decree No. 31/2001; in addition, tests on specimens of sea water must be negative to *Clostridium botulinum* and *Vibrio* spp. as regards the microbiological parameters, and the parameter regarding the boron content must remain on values lower than 1 mg/l.

Known from the document No. JP 2010 058080 is a method for treating sea water capable of reducing the size and costs of a known apparatus for treating sea water and of improving the service life of a separating membrane, as well as the apparatus for treating the water.

To do this, the document No. JP 2010 058080 envisages a method for the treatment of sea water that presents a so-called TEP-removal step, i.e., a step of removal of transparent exopolymer particles (TEPs). An exopolymer is a biopolymer secreted by an organism during its development, for example externally to the organism itself. These exopolymers include biofilms produced by bacteria that have the function of anchoring them and protecting them, during their development, from sea water, and is provided insertion of a first separation membrane only after the step of treatment of the sea water for applying membrane separation following upon the TEP-removal step. The TEP-removal step preferably envisages a step of introduction of magnetic particles in the sea water, so that the subsequent adhesion of the magnetic particles to the TEP component contained in sea water can start the step of separation of the TEP component that adheres to the magnetic particles of the sea water.

The fundamental disadvantage of the patent No. JP 2010 058080 is that it does not solve the problem of abatement of boron in order to obtain a sea water falling within the limits set down by EFSA for use for alimentary purposes.

The document No. CN 202201774 U describes a plant for treating sea water for marine cultures, which comprises a pump suitable for sea water, a pre-treatment unit, a membrane filtration unit for microfiltration/ultrafiltration, a particular type of pump for delivery of the liquid in the plant, a method of oxygenation of the water with a bubble-free membrane oxygenating unit and a UV sterilisation unit, these units being connected sequentially in series by a piping, and a further device for administering a chemical agent and a device for supplying oxygen, which is connected to the intake of the gaseous phase of said bubble-free membrane oxygenating unit, where said chemical agent of the administering device is added on a hydraulic stretch of the sterilisation process comprised between the UV sterilisation unit and a marine-culture tank.

The membrane filtration unit for microfiltration/ultrafiltration described in the document No. CN 202201774 U may moreover comprise a type or a plurality of types in combination of: an aerator, a sewage-discharge opening, a membrane cleaning device, and an integrated PLC (Programmable Logic Controller) automation-control system. The method or process envisaged by the document No. CN 202201774 U is simple to use and easy to implement for automatic operation, and, by treating sea water for marine culture or culture of circulation of waste waters by the plant for treating the waters of marine culture, it is possible to obtain a stable and high-quality sea water.

The fundamental disadvantage also present in the patent No. CN 202201774 U is that it does not solve the problem of abatement of boron in order to obtain a sea water falling within the limits set down by EFSA for use for alimentary purposes.

Also known from the document No. DE 102007040763 is a boron-selective ion-exchanger comprising polyol compounds, which is useful, for example, for selective separation of boron from liquids, including sea water, drinking water, or process water for or from electronics companies. This exchanger envisages an ion-exchanger containing polyol structures with a specific general formula.

Even though the process disclosed in the patent No. DE 102007040763 enables abatement of boron down to the level of parts per billion (ppb), does not envisage use of the water processed as sea water for alimentary use.

None of the above known solutions is able to provide sea water treated at an industrial level that will meet the requirements set down by EFSA and that will simultaneously provide a sea water that can be used for alimentary purposes.

Among the main purposes of the present invention is that of providing a process for the industrial production of purified and microbiologically pure sea water, moreover guaranteed so as not to present any toxic and noxious substances, in order to obtain, starting always from direct extraction of water from the sea, industrial amounts of the water itself that meets the current legislative requirements for being used as bulk sea water or bottled sea water in various applications also for alimentary use, with minimized production costs.

The above purposes are achieved by providing a process for industrial production of sea water that can be bottled and used also for alimentary use according to the annexed claims.

Figure 2:
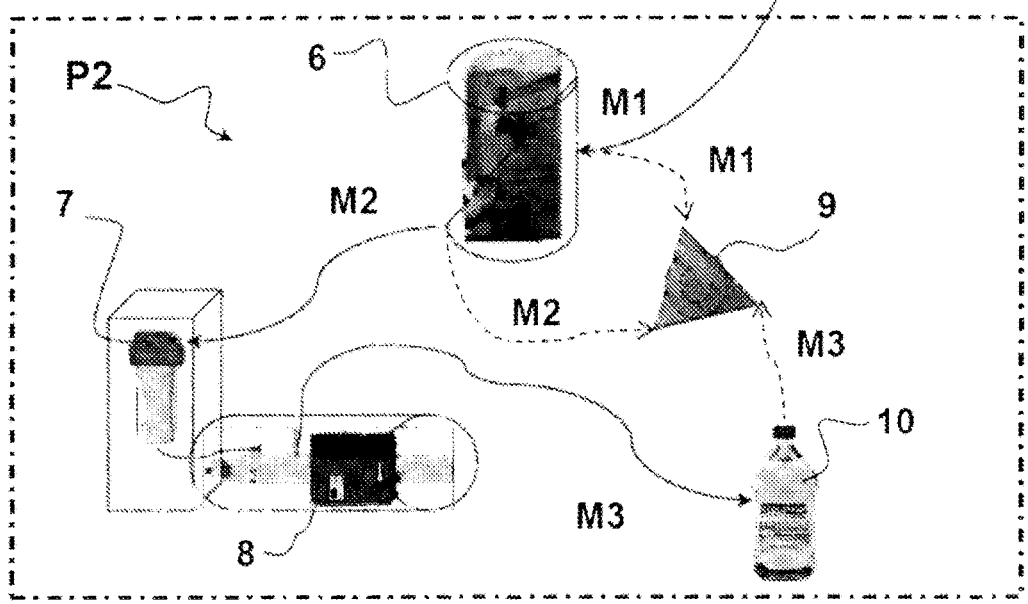

The above purposes and consequent advantages, as well as the characteristics of the industrial process according to the present invention, will emerge more clearly from the ensuing description of a preferred embodiment, which is provided hereinafter purely by way of non-limiting example, in particular with reference to the attached schematic drawings, wherein:

FIG. 1 is a scheme exemplifying the process of industrial production of sea water M already purified and filtered M1 using a technologically known plant P1; and FIG. 2 is a scheme exemplifying a treatment plant P2 according to the present invention, for further treatment of the already purified water M1, so that the latter, further treated, M3, will present such characteristics as to be suitable basically for alimentary use.

The process according to the present invention for the industrial production of purified and microbiologically pure sea water M3 has been devised to solve the real problems of management of a purification plant run by the present applicant.

To carry out the tests of functionality of the process devised, the latter has been tested on sea water M1 coming from a technologically known and officially recognized purification and filtration plant P1, which draws sea water M directly from the body of sea water located in front of the firm itself owned by the holder of the present patent application and subjects the sea water M itself to known physical processes in steps of sedimentation 3, filtration 4, and sterilisation 5.

In particular, as may be appreciated from the scheme appearing in FIG. 1, the water M is drawn from the sea through a delivery channel 2 and transferred into a sedimentation tank 3, where separator diaphragms enable sedimentation of the particulate present and overflow of the clarified supernatant. Present within this tank are the priming tubes of the pumps that carry the water from the aforesaid sedimentation tank to the depurator used in the filtration step 4, located in Mollusc-Purification Centres (MPCs)/Mollusc-Shipment Centre (MSC). The depurator is constituted by a total-filtration system, constituted by a pair of filtering columns in series containing sands with different grain size that are able to remove a large part of the turbidity present in the sea water. The sterilisation step 5 is guaranteed by a UV-lamp sterilizer containing a plurality of sterilizing units, each of which is provided with lamps that emit ultraviolet radiation having a wavelength ranging between 250 and 255 nm, and which are designed to denature and abate the genetic material of bacteria, mycetes, viruses, and micro-algae in the case where these possibly have survived the previous total-filtration system.

Thus treated in this MPC/MSC plant P1 of known technology, the water M1 is used for purification of the molluscs according to what is envisaged by the current regulations of the European Community.

Initially, even though the analytical results on specimens of purified sea water M1 at output from the above MPC/MSC plant P1 did not present anomalies from a microbiological standpoint, they presented, before the present process was devised, values of boron comprised between 3.3 and 3.9 mg/l. In order to bring the value of the boron parameter down to the limit of 1 mg/l as envisaged by the aforementioned EFSA opinion, a process for purification of sea water M has been devised in order to treat said sea water already purified M1 by subsequent insertion of a second totally innovative plant P2 on said MPC/MSC plants.

There was thus devised and installed a second plant P2 for further treatment of sea water that has already been purified M1 that uses an exchanger 6 with a selective ion-exchange resin for abatement of boron.

The present process for industrial purification of sea water is characterized in that provide in series to the aforesaid first known plant P1 is a second purification plant P2 for the treatment of the sea water M1 coming from said first purification plant P1 (which can be used for said MPC/MSC plant), said water M1, which has already been purified, undergoing a further and innovative treatment P2 prior to being sampled and analysed 9 and, then sent on to the final bottling step 10.

The second plant P2, in a preferred, but non-limiting, application, was initially designed for implementing the boron-abatement step 6 using exchangers containing 50 kg of resin, each of which is able to treat a flow rate of purified sea water M1 of approximately 2000 liters per hour. The sea water M1, passing through the resin, releases only boron that in anionic form binds to the cationic groups present on the resin itself. In this way, the eluate M2 maintains its original chemical composition without altering its other chemico-physical characteristics (in particular, the salinity and the ionic composition).

The sea water M2 at output from the plant for removal of boron, prior to undergoing the bottling step 10, undergoes a further filtration process or step 7 through a polypropylene-cartridge filter and a further total-sterilisation step 8 through a UV-radiation plant. In this case, the aforesaid cartridge filter 7 can be replaced periodically and in any case not before treatment of something like ten cubic meters of water, whilst the UV lamps can be replaced after approximately 8500-9000 hours of operation. Immediately after the second sterilisation process P2, the water thus treated M3 is, from analyses based on periodic random samplings 9, perfectly usable for alimentary purposes and hence can be bottled in polyethylene containers 10 of various capacity for foodstuffs.

In the scheme represented in FIG. 2, it may readily be appreciated how the water M3 produced with the process according to the present invention undergoes, with periodic random sampling, a plurality of analyses and checks 9 (dashed line from 9 to 10).

The process devised was previously tested by conducting stability tests at the company laboratory preserving specimens of water thus treated M3 in thermostatted conditions at a temperature of 37° C. for thirty, sixty, and ninety days, and the aforesaid samples made it possible to attribute a period of conservation of the product properly preserved of at least one year from the date of bottling.

As further verification of the correctness of the process devised and, hence, also as protection of the product and of the consumer, there an in-depth cycle of analyses has been carried out with sample checks 9 on the parameter of boron in the sea water sampled before (M1) and after (M2) installation of the plant for boron abatement using the exchanger 6. The step of analysis 9 of sea water also envisages check for vinyl chloride, acrylamide and epichlorohydrin (the samplings are represented in FIG. 2 with dashed lines having their origin in the points of tapping of sea water carried out in the stretches upstream, M1, and downstream, M2, of the plant with exchanger 6 and their end in the symbol indicating the aforesaid step of analysis 9). Moreover possible are further self-check analyses using a photometer for measuring the characteristic parameters of boron and the corresponding turbidity of the sea water M1 and M2 by means of a test kit and specific procedures. There are moreover envisaged periodic internal checks of the microbiological parameters on each production lot, both as regards the parameters of total bacterial load at 37° C. and 22° C. and as regards *Escherichia Coli* and Enterococci. There are moreover envisaged other analytical determinations imposed by current standards, including parameters such as *Vibrio* spp. and *Clostridium botulinum*.

In the bottling step 10, the format of the bottles containing the sea water for alimentary use M3 is envisaged from the minimum one (a few tens of milliliters) for single-use sachets or spray dispensers (as flavouring for salads where it is mixed with oil) to one-, two-, and three-liter bottles (as ingredient for cooking of fish, molluscs, shellfish, seaweed, pasta, rice, cereals, and vegetables), as well as in the five- and ten-liter, formats (for the preparation of doughs for oven products, bread, pizza, salty confectionery products, and in order to keep alive, or guarantee freshness of, fish, molluscs, shellfish, and seaweed).

The fundamental advantage of the process according to the present invention, which subjects the sea water M, in addition to said steps or processes of decantation 3, filtration 4, and sterilisation 5, also to further steps of boron abatement 6 with further subsequent steps of filtration 7 and total sterilisation 8 of the micro-organisms, is to guarantee (by means of continuous and strict steps of analyses and checks 9 of the sea water M, along the various purification stages thereof M1, M2, M3) a sea water. M3 that is microbiologically pure and hence free from any pathogenic agents, with the corresponding advantages that it can be used even in bottles 10 for a wide range of uses, amongst which basically alimentary use.

It is also evident that numerous modifications, adaptations, integrations, variations, and substitutions of elements with other functionally equivalent ones may be made to the example of embodiment of the process according to the invention, previously described by way of illustrative and non-limiting example, without thereby departing from the sphere of protection of the ensuing claims.

The invention claimed is:
1. A process for industrial production of sea water suitable for alimentary use, comprising the following steps:
   A) drawing sea water and decanting the sea water to obtain decanted sea water;
   B) filtering the decanted sea water to obtain a filtered sea water;
   C) sterilizing the filtered sea water to obtain a purified sea water;
   D) abating boron content in the purified sea water to obtain a sea water with a boron content of less than one milligram per liter;
   E) filtering the sea water with a boron content of less than one milligram per liter to obtain a filtered sea water with a boron content of less than one milligram per liter;
   F) sterilizing the filtered sea water with a boron content of less than one milligram per liter to obtain a sea water suitable for alimentary use;
   G) continuously analysing, examining, and checking of the purified sea water obtained in step C), the sea water with a boron content of less than one milligram per liter in step D), and the sea water suitable for alimentary use in step F), to guarantee that the obtained sea water suitable for alimentary use is purified, filtered, and, hence, free from any pathogenic agent; and
   H) storing in tanks or bottling the sea water suitable for alimentary use.

2. The process according to claim 1, wherein the steps D), E), F), and G) and the step H) for bottling the sea water suitable for alimentary use are carried out in a plant configured to be supplied with the purified sea water of Mollusc-Purification Centres (MPCs) which carry out steps A), B), and C).

3. The process according to claim 2, wherein said abating boron content in the purified sea water of step (D) is carried out with an exchanger using an ion-exchange resin specifically selective for abatement of boron by passing the purified sea water obtained in step C) through said resin, without using any chemical substances and magnetic methods for boron abatement.

4. The process according to claim 1, wherein abating boron content in step D) is carried out with an exchanger using an ion-exchange resin specifically selective for abatement of boron by passing the purified sea water obtained in step C) through said resin, without using any chemical substances and magnetic methods for boron abatement.

5. The process according to claim 4, wherein:
   sterilizing the filtered sea water in step C) is carried out via processes of purification used in Mollusc-Purification Centres (MPCs), and
   passing the purified sea water through the resin of the exchanger during the abating of boron content in step D) removes exclusively boron in anionic form from the purified sea water, providing the filtered sea water with a boron content lower than one milligram per liter and preserving all other chemico-physical and organoleptic characteristics possessed by the sea water before abating the boron content, said organoleptic characteristics being fundamental for alimentary use.

6. The process according to claim 1, wherein abating boron content in step D) is able to treat a flow rate of the purified sea water obtained from step C) of approximately two thousand liters per hour is provided with an exchanger containing approximately fifty kilograms of ion-exchange resin.

7. The process according to claim 6, wherein:
   sterilizing the filtered sea water in step C) is carried out via processes of purification used in Mollusc-Purification Centres (MPCs), and
   passing the purified sea water through the resin of the exchanger during the abating of boron content in step (D) removes exclusively boron in anionic form from the purified sea water, providing the filtered sea water with a boron content lower than one milligram per liter and preserving all other chemico-physical and organoleptic characteristics possessed by the sea water before abating the boron content, said organoleptic characteristics being fundamental for alimentary use.

8. The process according to claim 1, wherein filtering the sea water with a boron content of less than one milligram per liter of step E) is a step of microfiltration that is carried out in a plant with polypropylene-cartridge filters.

9. The process according to claim 1, wherein the obtained sea water suitable for alimentary use is also suitable for vegan biological food diets.

10. The process according to claim 1, wherein via said step (F) of sterilizing the filtered sea water with a boron content of less than one milligram per liter, the obtained sea water suitable for alimentary use is qualitatively stable after bottling such that characteristics of the sea water suitable for alimentary use are maintained unaltered for at least one year from a date of bottling.

11. The process according to claim 1, wherein the storing or bottling of the sea water suitable for alimentary use in step (H) is carried out using containers of capacities ranging from a few tens of milliliters in single-use sachets or spray dispensers to ten-liters in bottles.

12. The process according to claim 11, wherein the bottling of the sea water suitable for alimentary use in step (H) is carried out using bottles of capacity selecting from the group consisting of one liter, two liters, three liters, five liters, and ten liters.

13. A process for industrial production of sea water suitable for alimentary use, comprising the steps of:
   drawing sea water;
   subjecting the sea water to a sedimentation process to reduce particulate content in the sea water and obtain a clarified sea water;
   filtering the clarified sea water sea water with a reduced particulate content to further reduce particular content and reduce turbidity, thereby obtaining a filtered sea water;
   sterilizing the filtered sea water to denature and abate bacteria, mycetes, viruses, and micro-algae, thereby obtaining a purified sea water;
   subjecting the purified sea water to a boron abatement process in which the purified sea water passes through an ion-exchange resin to which only boron binds so that water salinity and remaining ion content of the purified sea water remain unchanged, thereby obtaining sea water with a reduced boron content of less than one milligram per liter having salinity and remaining ion content unchanged from said the purified sea water;
   subjecting the sea water with the reduced boron content to a filtration process using a polypropylene cartridge filter, thereby obtained filtered sea water with a reduced boron content;
   sterilizing by UV-radiation the filtered sea water with a reduced boron content to provide a sea water that is free of pathogenic agents, thereby obtaining a sea water suitable for alimentary use; and storing the sea water suitable for alimentary use into at least one container, wherein the purified sea water obtained, the sea water with a reduced boron content obtained, and the sea water suitable for alimentary use obtained from sterilizing by UV-radiation are continuously analysed, examined and checked to guarantee that the obtained sea water suitable for alimentary use prior to storing is purified, filtered, and free from any pathogenic agent.

* * * * *